United States Patent [19]

Kuzara

[11] Patent Number: 5,584,544
[45] Date of Patent: Dec. 17, 1996

[54] ELECTRONIC LIBRARIAN AND FILING SYSTEM

[75] Inventor: Patricia A. Kuzara, Sheridan, Wyo.

[73] Assignee: Elf Technologies Corporation, Sheridan, Wyo.

[21] Appl. No.: 330,713

[22] Filed: Oct. 28, 1994

[51] Int. Cl.⁶ .................................................. A47B 81/06
[52] U.S. Cl. ........................................ 312/9.36; 312/9.23
[58] Field of Search ................................. 312/9.23, 9.29, 312/9.31, 9.32, 244, 9.12, 9.15, 9.36, 9.37, 9.34

[56] References Cited

U.S. PATENT DOCUMENTS

| | | | |
|---|---|---|---|
| 1,574,319 | 2/1926 | Vincent | 312/9.37 |
| 1,755,074 | 4/1930 | Ray et al. | |
| 2,426,712 | 9/1947 | Simpson . | |
| 2,539,647 | 1/1951 | Willimas | 312/9.23 |
| 2,763,366 | 9/1956 | Smith | 312/44 |
| 2,864,526 | 12/1958 | Boss . | |
| 3,582,168 | 6/1971 | Birn | 312/9.36 |
| 4,609,332 | 9/1986 | Florence | 312/9.31 |
| 4,875,743 | 10/1989 | Gelardi et al. | 312/13 |
| 4,920,432 | 4/1990 | Eggers et al. | 360/33.1 |
| 5,022,020 | 6/1991 | Langman et al. | 369/37 |
| 5,103,437 | 4/1992 | Kawakami | 369/36 |
| 5,117,984 | 6/1992 | Kennedy | 211/41 |
| 5,150,221 | 9/1992 | Saima | 358/403 |
| 5,214,628 | 5/1993 | Langman et al. | 369/37 |
| 5,241,466 | 8/1993 | Perry et al. | 364/401 |
| 5,275,480 | 1/1984 | Hyman et al. | 312/9.23 |
| 5,299,181 | 3/1994 | Kogucki | 369/32 |

FOREIGN PATENT DOCUMENTS

0347332  4/1931  United Kingdom ................. 312/9.36

*Primary Examiner*—Peter R. Brown
*Assistant Examiner*—Gerarld Anderson
*Attorney, Agent, or Firm*—John R. Flanagan

[57] ABSTRACT

An electronic librarian and filing system includes an article storage unit, article locator mechanism, article retrieval mechanism, and electronic control unit. The article storage unit has a receptacle storing articles, such as individual CD's on edge, in successive side-by-side compartments. The article locator mechanism disposed in the receptacle is movable relative to the successive compartments to identify the location of each of the successive compartments and thus of the articles stored therein. The article retrieval mechanism carried with the article locator mechanism is operable to partially remove a selected one of the CD's from its compartment so that it can subsequently be fully removed from the receptacle by a user. The electronic control unit is coupled to the article locator mechanism. The electronic control unit includes a keyboard to use to input information which identifies CD's stored in the article storage unit and their unique locations, a display to output such information, a microprocessor to process inputted information and the information obtained from reading the locations of the CD's by the article retrieval mechanism, and a memory to store the information which can be accessed via the microprocessor by use of the keyboard and reviewed on the display.

27 Claims, 4 Drawing Sheets

ELECTRONIC LIBRARIAN AND FILING SYSTEM

BACKGROUND OF THE INVENTION

1. Field of the Invention

The present invention generally relates to systems for filing, storing and retrieving articles and, more particularly, is concerned with an electronic librarian and filing system for storage and retrieval of articles, one example of such articles being compact discs (CD's).

2. Description of the Prior Art

Compact disc (CD) user frustration arises from not being able to carry and easily access a large number of compact discs (CD's), especially for CD systems employed in vehicles and the like. While in their protective cases, CD's are cumbersome to handle and carry around, difficult to store in the vehicle, and awkward to remove and install, especially when driving.

There are two types of solutions to this problem currently in the marketplace. One solution is the provision of a flip box for CD's. The flip box is in the form of a small box that has pages in it like a loose leaf notebook. Each page has a plastic protector into which the CD is inserted to protect it. The user must open the box, flip through the pages, read the small CD titles and select and remove the CD the user desires to play. Although better than carrying the CD's in their individual cases, the flip box is limited to 24–40 CD's and locating, retrieving and returning CD's is not easy.

Another solution is the provision of a multi-CD player. Some multi-CD players which typically are limited to playing up to four CD's are mounted in the dash of the vehicle. Other multi-CD players which typically play up to six CD's are mounted in the trunk of the vehicle and linked electronically to a selector keyboard on the dash. Other multi-CD players used in the home, office or business environment can play even larger numbers of CD's. However, these players are very complex, quite expensive and, in the case of the vehicle multi-CD players, very limited with respect to the number of CD's accommodated.

Consequently, a need still exists for a suitable CD storage and retrieval system. The vast majority of CD users still use single CD players and are expected to continue such use for considerable time. Thus, a suitable CD storage and retrieval system will be one that is easily portable, will hold an adequate number of CD's, will easily fit on the center console or front seat of a vehicle, provide easy access to the CD's stored therein, and make it easy to find where to locate the CD and to retrieve the chosen CD.

SUMMARY OF THE INVENTION

The present invention provides an electronic librarian and filing system designed to satisfy the aforementioned need. The system described herein solves all of the aforementioned problems and fills the gap between the flip box, which is difficult to use and limited in the number of CD's being handled, and the multiple CD players which are expensive and also limited in the number of CD's accommodated.

While the electronic librarian and filing system of the present invention is particularly suited for storage and retrieval of CD's, the principles of the present invention are not so limited in their application. It should be realized and understood that a CD is merely one example of a type of article to which the electronic librarian and filing system can be applied. However, the system functions particularly well in meeting the criteria outlined above for suitability as a CD storage and retrieval system, that is, has portability, adequate capacity, ability to fit on the center console or front seat of a vehicle, and easy accessibility to stored CD's in terms of finding their location and retrieving a chosen CD.

Accordingly, the present invention is directed to an electronic librarian and filing system which comprises: (a) an article storage unit storing articles in successive side-by-side spaced unique locations; (b) an article locator mechanism disposed in the article storage unit and movable relative to the successively stored articles to read the unique locations thereof in the article storage unit; and (c) an article retrieval mechanism disposed in the article storage unit and movable with the article locator mechanism, the article retrieval mechanism being actuatable to at least partially remove a selected one of the articles from the unique location thereof in the article storage unit so that it can be fully removed from the article storage unit.

More particularly, the article storage unit of the system includes an elongated receptacle, a support rack, an elongated carrying handle, and a cover assembly. The receptacle has an interior cavity. The support rack is disposed in the interior cavity and defines a row of individual storage compartments removably supporting the articles in a spaced side-by-side vertical relationship with respect to one another. The handle is mounted to undergo pivotal movement between an upright position and a folded position relative to the receptacle. In the upright position, the handle is deployed above the receptacle to permit gripping of the handle and carrying of the storage unit. In the folded position, the handle is stowed behind the receptacle out of the way. The cover assembly includes front and rear lid sections movable relative to the receptacle between closed and opened positions. In the closed position, the front and rear lid sections are disposed in side-by-side relationship with respect to one another, extending over the cavity of the receptacle. In the opened position, the front and rear lid sections are disposed in overlapped relationship with respect to one another, exposing the cavity of the receptacle.

The article locator mechanism of the system includes a carriage and a location reading arrangement. The carriage is mounted between laterally spaced front and rear guides to undergo sliding movement along the underside of the support rack in the receptacle. The front and rear guides are located in the lower portion of the cavity of the receptacle below the support rack. The location reading arrangement includes a row of markings and a location reader device. The markings are defined on the receptacle adjacent to the rear guide. Each marking is aligned with one of the storage compartments in the support rack. The location reader device is mounted on the carriage so as to face toward the row of markings. The reader device is operable to sense the different markings and thus provide a reading of the one of the markings with which it happens to be aligned.

The article retrieval mechanism of the system includes an actuator lever and an ejector member which are supported by the carriage of the article locator mechanism and thus are adapted to work in coordination with the article locator mechanism. The actuator lever is pivotally mounted on the front guide. The lever at its outer end extends from the receptacle and at its inner end is pivotally coupled to the ejector member. The ejector member underlies the support rack in the receptacle and is slidably mounted in undergo vertical movement through an opening defined in the carriage. Once the carriage and reader device have moved into alignment with the one of the markings identifying the unique location of the one of the storage compartments in the support rack containing the desired article to be retrieved, the actuator lever is pivoted to slidably move and lift the ejector member upwardly through an elongated slot formed in the bottom of the support rack so as to cause lifting of desired article at least partially upwardly from the one storage compartment of the support rack so as to make it easy for the user to then grip portions of the article and fully remove it from the receptacle.

The electronic librarian and filing system also comprises an electronic control unit coupled to the article locator mechanism. The electronic control unit includes means, such as a display, for providing at least an output of the unique locations of the articles as they are sensed and read by the article locator mechanism. The electronic control unit of the system also includes means, such as a microprocessor, for processing inputted information identifying the articles stored in the article storage unit, means, such as a memory connected to the microprocessor, for storing the inputted information, and means, such as a keyboard connected to the microprocessor, for initially inputting such information and for providing access, that is, to call-up and review, such information about the articles stored therein. The display also is connected to the microprocessor. The microprocessor is programmed to function in scan and search modes so as to access the memory and find the unique location of a selected article in the article storage unit. Once the desired location has been identified, the user can then move the location reader device of the article locator mechanism relative to the receptacle to read the respective markings thereon and find the desired unique location of the selected article in the article storage unit so that the article ejector mechanism can be operated to at least partially remove the selected article from the unique location.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figures 1, 2A, 3:
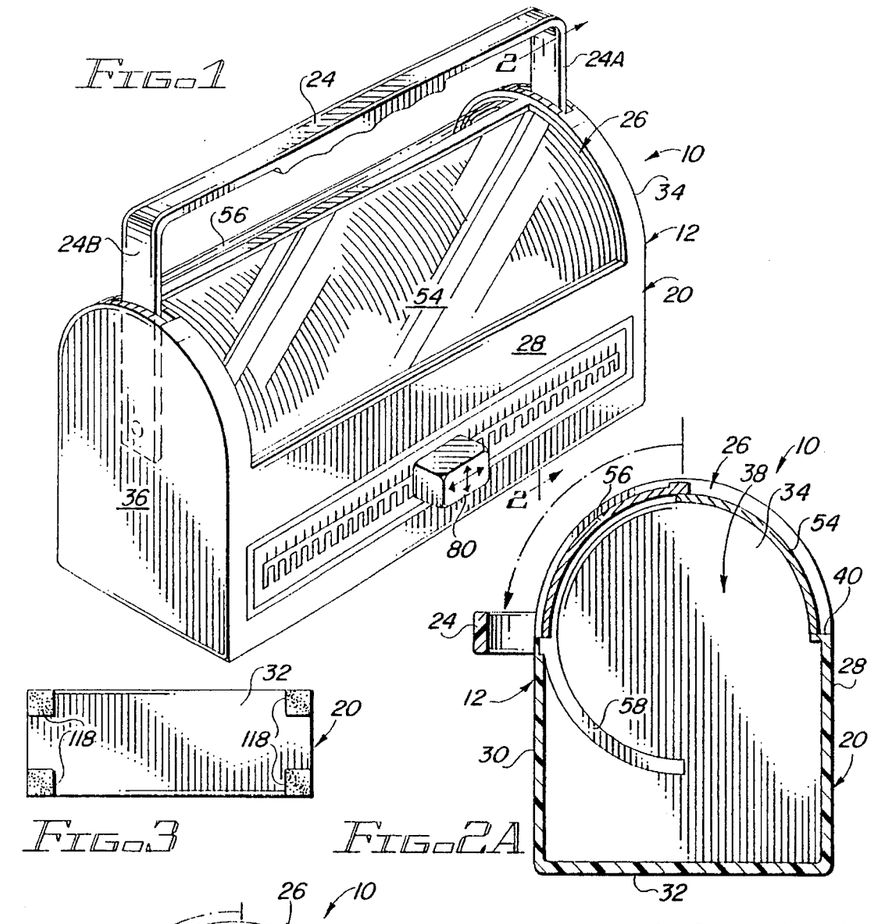
FIG. 1 is a perspective view of an article storage unit of an electronic librarian and filing system of the present invention.
FIGS. 2A, 2B and 2C are cross-sectional views taken along line 2—2 of FIG. 1, showing a sequence of steps for converting the handle of the article storage unit from an upright to folded position and the lid assembly of the storage unit from a closed to opened position.
FIG. 3 is a bottom plan view, on a reduced scale, of the receptacle of the article storage unit.
Figures 6, 7, 8, 9:
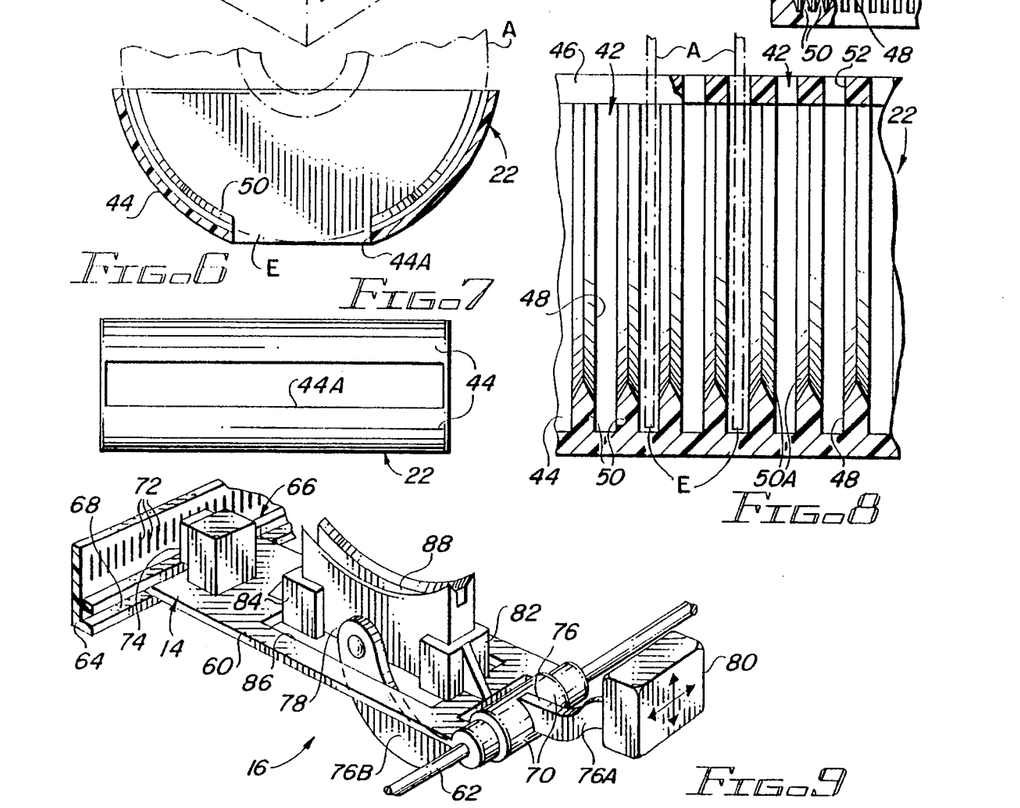
FIG. 6 is an enlarged cross-sectional view of the support rack taken along line 6—6 of FIG. 4.
FIG. 7 is a bottom plan view, on a reduced scale, of the support rack.
FIG. 8 is an enlarged fragmentary longitudinal sectional view of the support rack taken along line 8—8 of FIG. 4.
FIG. 9 is a perspective view of article locator and retrieval mechanisms of the electronic librarian and filing system of the present invention.
Figures 10A, 10B, 11:
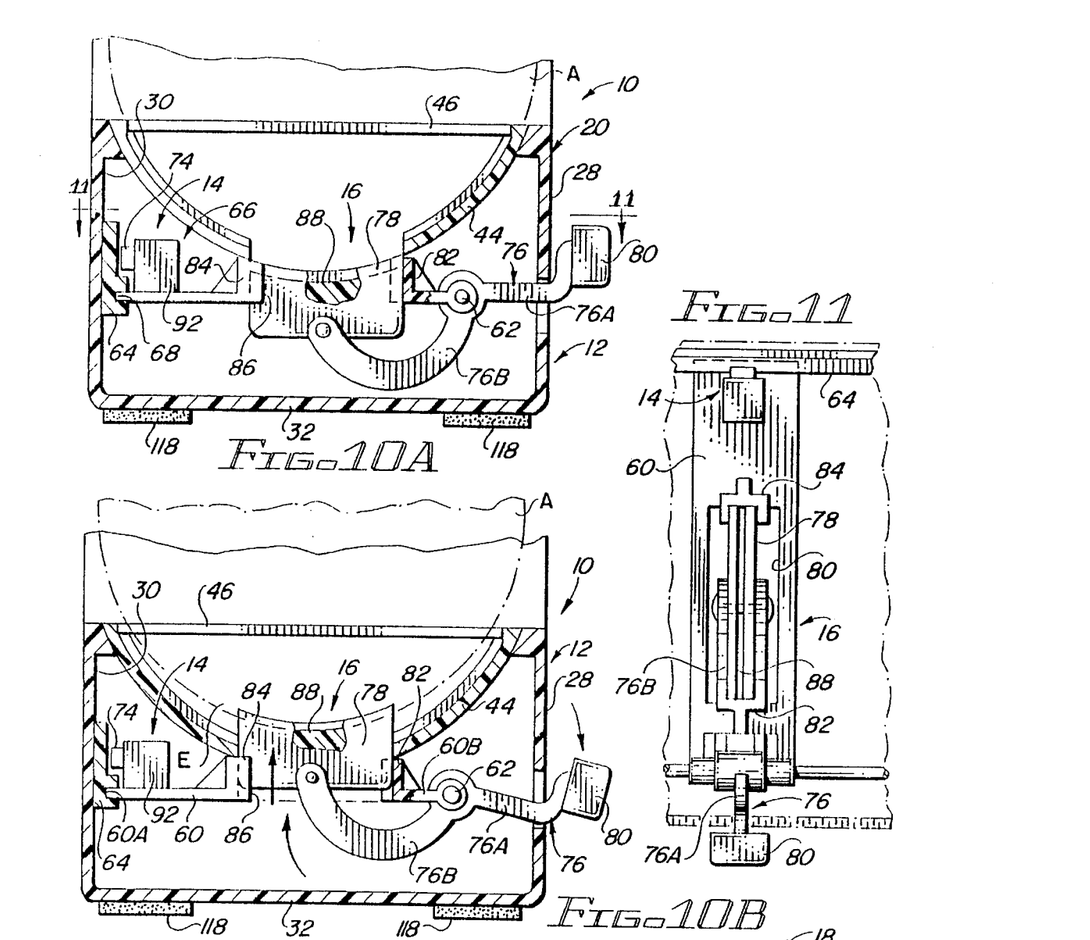
FIG. 10A is a side elevational view of the article locator and retrieval mechanisms showing the article retrieval mechanism in an unactuated rest position.
FIG. 10B is a side elevational view similar to that of FIG. 10A but showing the article retrieval mechanism in an actuated raised position.
FIG. 11 is a top plan view of the article locator and retrieval mechanisms as seen along line 11—11 of FIG. 10A.
Figure 12:
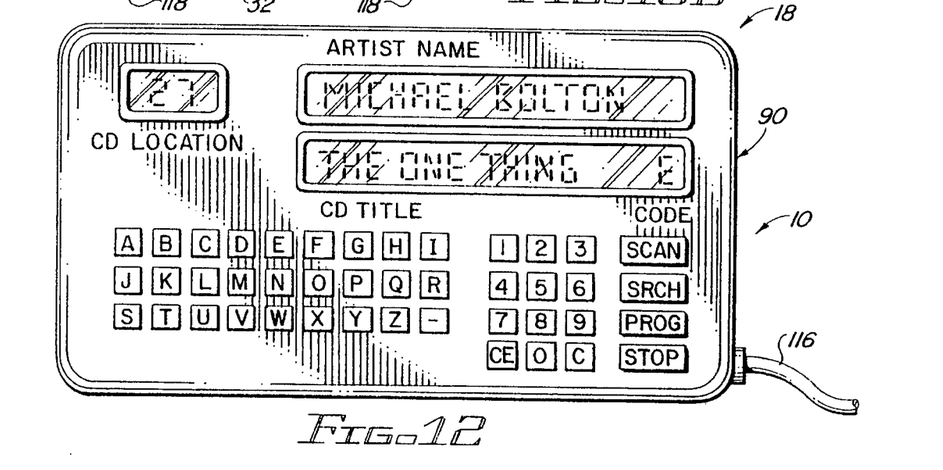
FIG. 12 is a front elevational view of an electronic control unit of the electronic librarian and filing system of the present invention.
Figure 13:
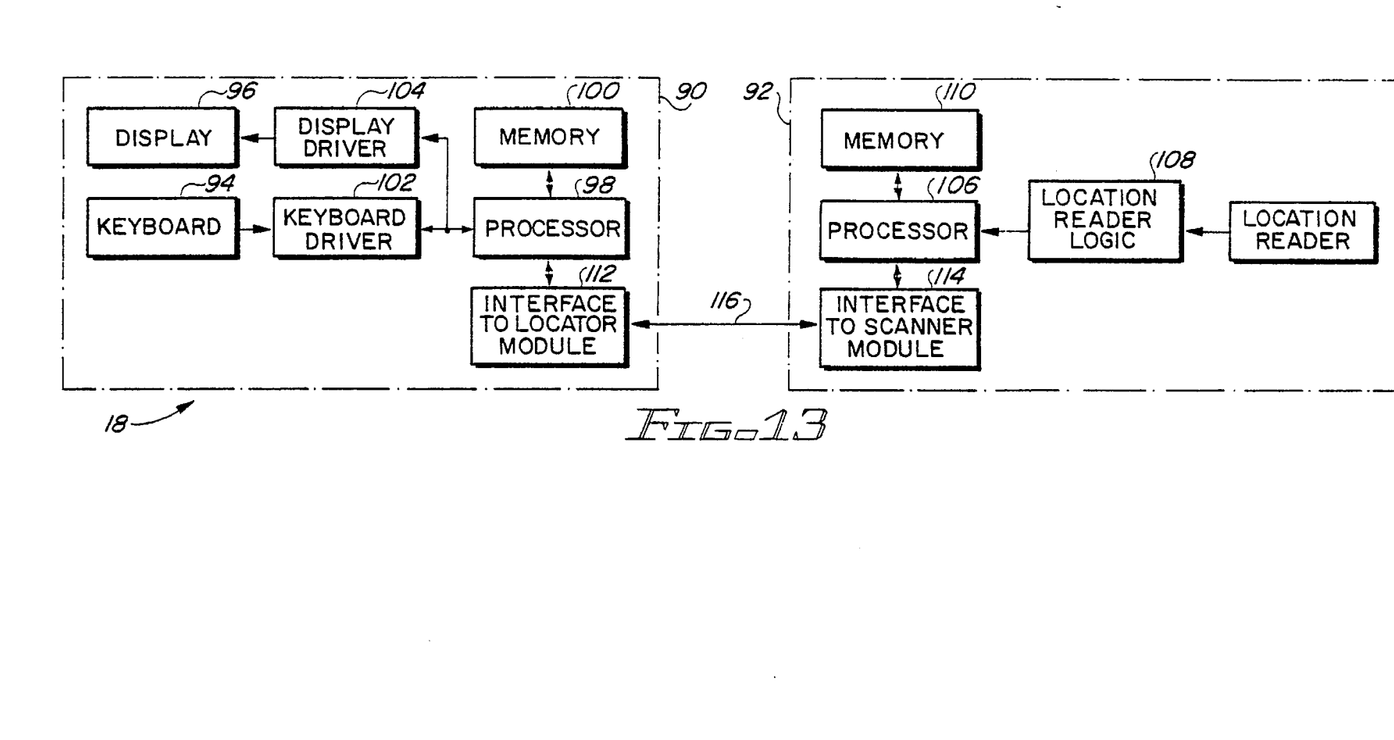
FIG. 13 is an electrical block diagram of the electronic control unit of FIG. 12.

Referring to the drawings and particularly to FIGS. 1 and 12, there is illustrated an electronic librarian and filing system of the present invention, generally designated 10. Basically, the electronic librarian and filing system 10 include an article storage unit 12 (FIGS. 1–8), article locator mechanism 14 (FIGS. 9–11) and article retrieval mechanism 16 (FIGS. 9–11). Preferably, the system 10 also includes an electronic control unit 18 (FIGS. 12 and 13). The article storage unit 12 stores articles A, such as individual CD's on edge, in successive side-by-side spaced unique locations. The article locator mechanism 14 is disposed in the article storage unit 12 and movable relative to the successive articles A to read the unique locations thereof in the article storage unit 12. The article retrieval mechanism 16 is moved with the article locator mechanism 14 and can be actuated to partially remove or raise a selected one of the articles A from its location in the article storage unit 12 so that it can subsequently be fully removed therefrom, such as manually by a user. The electronic control unit 18 is coupled to the article locator mechanism 14 to provide a display of the unique locations of the articles as they are read by the article locator mechanism 14. The electronic control unit 18 also functions to input, store and retrieve information identifying all of the articles A stored in the article storage unit 12 and their unique locations therein such that the unique location of a selected one of the articles can be found.

Referring to FIGS. 1–8, the article storage unit 12 of the system 10 includes an elongated receptacle 20, a support rack 22, and an elongated handle 24, and a cover assembly 26. The receptacle 20 of the article storage unit 12 has a pair of front and rear walls 28, 30, a bottom wall 32, and a pair of end walls 34, 36. The walls are connected together at their adjacent edges so as to define an interior cavity 38. The end walls 34, 36 have semi-cylindrical upper portions which extend above the horizontal upper edges of the front and rear walls 28, 30 so as to define a semi-cylindrical opening 40 on the upper portion of the receptacle 20 leading into the interior cavity 38 thereof.

The support rack 22 of the article storage unit 12 is disposed in the interior cavity 38 of the receptacle 20 below the upper opening 40 thereof and defines a plurality of individual storage compartments 42 for receiving and supporting a plurality of articles A, such as CD's positioned vertically on edge, in a spaced side-by-side relationship. The support rack 22 includes a bottom wall 44 having a curved configuration of semi-cylindrical shape and a top wall 46 overlying and fitted upon the upper end of the bottom wall 44 and having a flat configuration. The storage compartments 42 are defined by a series of spaced recesses 48 defined between ribs 50 formed on the interior surface of the bottom wall 44 and a series of spaced slots 52 defined through the top wall 46. The spaced slots 52 are disposed above and in alignment with the recesses 48 so as to receive articles through the respective slots 52 of the top wall 46 and support the lower edge portions E of the articles A in the recesses 48. The recesses 48 have the same curved or semi-cylindrical shape as the bottom wall 44 for accommodating the semi-circular edge portions E of the CD's. The ribs 50 also have bevelled outer edges 50A which assist in guiding insertion of the curved edges E of the CD's into the recesses 48.

The carrying handle 24 of the article storage unit 12 has a generally U-shaped configuration and is pivotally mounted at opposite end legs 24A, 24B thereof to the opposite end walls 34, 36 of the receptacle 20 to undergo pivotal movement relative to the receptacle 20 between an upright position, as shown in FIG. 1, and a folded position, as shown in FIGS. 2A–2C and 4. In the upright position of FIG. 1, the handle 24 is deployed above and along the upper opening 40 to the interior cavity 38 of the receptacle 20 permitting gripping of the handle 24 and carrying of the storage unit 12. In the folded position of FIGS. 2A–2C and 4, the handle 24 is stowed behind the receptacle 20 out of the way.

Figure 2B:
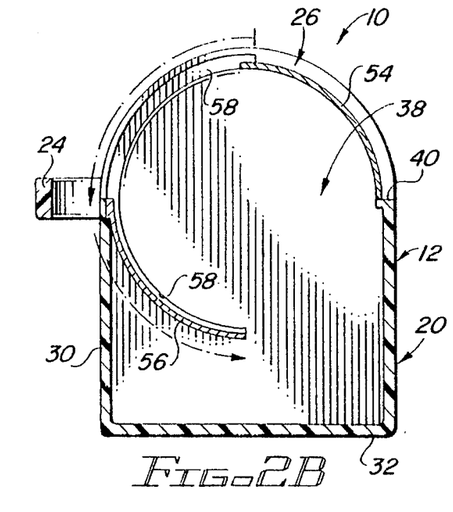
Figure 2C:
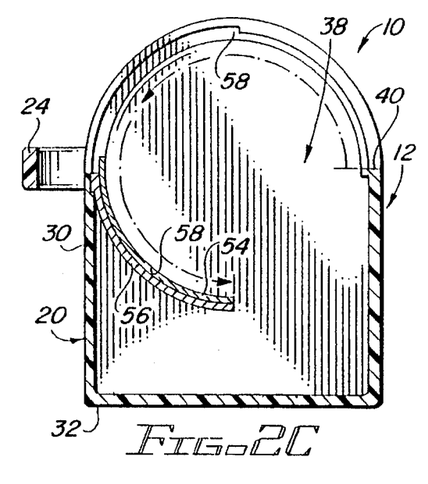
Figures 4, 5:
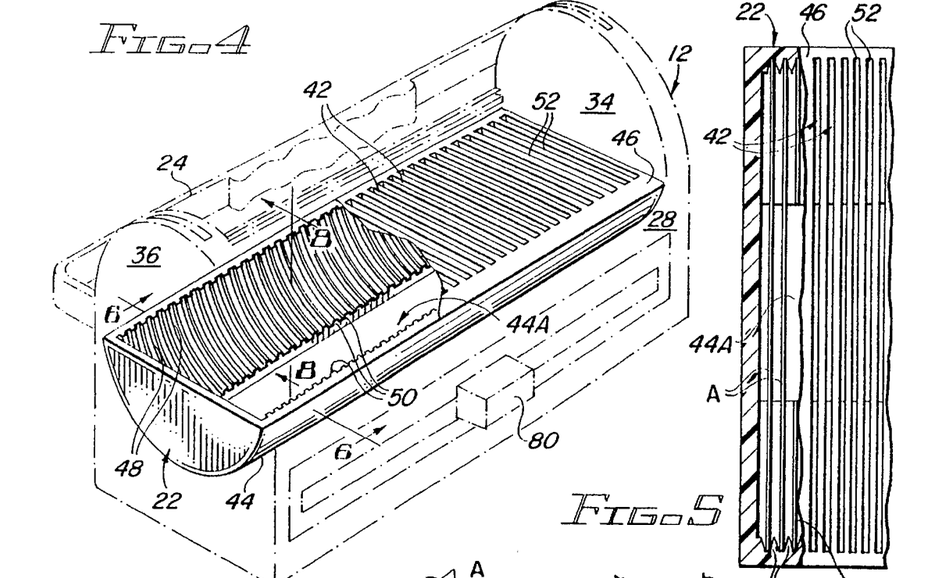
FIG. 4 is a perspective view of a support rack disposed in the receptacle of the article storage unit.
FIG. 5 is an enlarged fragmentary top plan view of the support rack with portions broken away.

The cover assembly 26 of the article storage unit 12 includes arcuate-shaped front and rear lid sections 54, 56 being being slidable mounted at respective opposite ends in matching arcuate-shaped guide channels 58 formed on the interior surfaces of the opposite end walls 34, 36 of the receptacle 20. As seen specifically in FIGS. 2A–2C, the front and rear lid sections 54, 56 are movable relative to the receptacle 20 between a closed position (FIGS. 1 and 2A) and an opened position (FIG. 2C). In the closed position of FIG. 1, the front and rear lid sections 54, 56 are disposed in side-by-side relationship with respect to one another and together extend over the interior cavity 38 and cover the semi-cylindrical opening 40 defined in an upper portion of the receptacle 20 between the opposite end walls 34, 36 thereof. In the opened position of FIG. 2C, the front and rear lid sections 54, 56 are disposed in overlapped relationship with respect to one another and uncover and expose the semi-cylindrical opening 40 defined in the upper portion of the receptacle 20.

Referring to FIGS. 9–11, the article locator mechanism 14 of the system 10 includes a carriage 60, means in the form of spaced front and rear guide members 62, 64 mounting the carriage 60 to undergo movement in the receptacle 20 along the guide members 62, 64, and a location reading arrangement 66 mounted on the carriage 60 and receptacle 20. The carriage 60 of the article locator mechanism 14 is mounted between laterally spaced front and rear guide members 62, 64 to undergo sliding movement between opposite end walls 34, 36 of the receptacle 20. The front and rear guide members 62, 64 are located in the lower portion of the interior cavity 38 of the receptacle 20 below the support rack 22 therein. In an exemplary form, the front guide member 62 is in the form of a rod 62 mounted between the opposite end walls 34, 36 of the receptacle 20 and in spaced relation from the front wall 28 thereof. The rear guide member 64 is in the form of a rail 64 attached along the interior surface of the rear wall 30 of the receptacle 20. The carriage 60 is in the form of a flat platform 60 having a rear edge portion 60A slidably received within a groove 68 of the rear guide rail 64 and a pair of spaced collars 70 attached to an opposite front edge portion 60B of the platform 60 and slidably received over the front guide rod 62.

The location reading arrangement 66 of the article locator mechanism 14 includes a row of markings 72 and a location reader device 74. The markings 72 may take any suitable form, such as spaced parallel painted lines applied on or spaced parallel indents defined in the rear wall 30 of the receptacle 20 located above the rear guide rail 64. Each marking 72 is aligned with one of the storage compartments 42 in the support rack 22 and thus identifies a unique location of one of the articles A supported and stored by the support rack 22. The location reader device 74 is mounted on an upper surface of the carriage 60 adjacent to the rear edge portion 60A thereof and faces toward the row of markings 72. The reader device 74 is operable to sense individual ones of the different markings 72 when aligned therewith and thus provide a reading of the one of the markings 72 with which it happens to be aligned. The operation of the reader device 74 and markings 72 can be based on any of several conventional techniques, such as photoelectric, magnetic and the like. In the case of photoelectric techniques, the reader device 74 would emit and receive a light beam which is reflected back by individual ones of the markings 72.

Referring again to FIGS. 9–11, the article retrieval mechanism 16 of the system 10 includes an actuator lever 76 and an ejector member 78 which are supported by the carriage 60 of the article locator mechanism 14 and thus are adapted to work in coordination with the article locator mechanism 14. The actuator lever 76 of the article retrieval mechanism 16 16 is pivotally mounted on the front guide rod 62 and has a outer handle portion 76A and an inner link portion 76B. The outer handle portion 76A of the actuator lever 76 has a knob 80 thereon which extends to exterior of the receptacle 20 to where it can be gripped by a user in order to slidably move the carriage 60. The inner link portion 76B of the actuator lever 76 is pivotally coupled to the ejector member 78.

The ejector member 78 of the article retrieval mechanism 16 underlies the support rack 22 in the receptacle 20 and is slidably mounted between a pair of guide tracks 82, 84 being U-shaped in cross-section and facing toward one another. The guide tracks 82, 84 are attached to the carriage 60 and disposed at opposite ends of an opening 86 defined through the carriage 60. The ejector member 78 is thereby mounted to undergo vertical movement through the opening 86 and relative to guide tracks 82, 84. Once the reader device 74 and thus the carriage 60 have been moved into alignment with the one of the markings 72 identifying the location of the one of the storage compartments 42 in the support rack 22 containing the desired article A, such as the desired CD, to be retrieved, then the actuator lever 76 is pivoted to slidably move and lift the ejector member 78 upwardly through an elongated slot 44A formed in the bottom wall 44 of the support rack 22. A concave-shaped groove 88 in the upper end of the ejector member 78, being moved in an upwardly direction by the actuator lever 76, receives the lower edge E of the CD therein. The ejector member 78 pops up or lifts the CD partially upwardly from the one storage compartment 42 of the support rack 22 so as to make it easy for the user to then grip portions of the CD and remove it from the receptacle 20.

Referring to FIGS. 12 and 13, the electronic control unit 18 of the system 10 can include a portable scanner module 90 and a locator module 92. The portable scanner module 90 is a hand-held device which can be carried by the user to and from the location of use, such as a vehicle. At the location of use, the scanner module 90 can be inserted into a mounting bracket (not shown) or the like and then electrically connected to the locator module 92 in the storage unit 12.

The scanner module 90 of the control unit 18 includes a keyboard 94 to use to input information which identifies CD's stored in the article storage unit 12 and their unique locations, a display 96 to output such information, a microprocessor 98 to process inputted information and the information obtained from reading the locations of the CD's by the article locator mechanism 14, and a memory 100 to store the information being coupled to the microprocessor 98. The keyboard 94 and display 96 are coupled to the microprocessor 98 via respective keyboard and display drivers 102, 104. Information stored in the memory 100 can be accessed via the microprocessor 98 by use of the keyboard 94 and reviewed on the display 96.

The locator module 92 is mounted on the carriage 60 in the storage unit 12 and is electrically coupled to the reader device 74 of the article locator mechanism 14. The locator module 92 of the control unit 18 can include a locator microprocessor 106 connected through suitable location reader logic 108 to the location reader device 74 and a memory 110 coupled to the locator microprocessor 106. The microprocessors 98, 106 of the respective scanner and locator modules 90, 92 are coupled to one another through respective interfaces 112, 114 which, in turn, are connected to one another by a cable 116 shown in FIG. 12 and diagrammatically represented by line 116 in FIG. 13.

The scanner microprocessor 98 can be programmed to function in scan and search modes so as to access the memory 100 and find the unique location of a selected CD in the article storage unit 12. Once the desired location has been identified, the user can then move the location reader device 74 of the article locator mechanism 14 relative to the receptacle 20 and read the respective markings 72 thereon and find the desired unique location of the selected CD in the article storage unit 12 so that the article retrieval mechanism 16 can be operated to at least partially lift out or "pop-up" the selected CD.

In the initial filling of the storage unit 12 with CD's, as each CD is inserted into each unique location in the receptacle 10 the keyboard 94 is used to enter the location number, artist's name and CD title into the scanner microprocessor 98. Also, a code for the type of music (for example, "R" for Rock, "C" for Classical, "E" for Easy Listing, "O" for Oldies, "P" for Pop, etc.), is entered. As each are entered the information is displayed on the different windows of the display 96 on the front of the scanner module 90, as seen in FIG. 12. This information is automatically stored in the scanner memory 100.

In the scan mode, the scanner microprocessor 98 allows the user to review the entire CD library in the storage unit 12, starting with the first location and moving sequentially through to the last location. By pressing a SCAN button on the scanner module 90, the microprocessor 98 will scan memory 100 and the display 96 will display each location number, artist's name, CD title and type of music category in memory. Each will be displayed for a preset period of time, such as about three seconds for the use to read the display 96. The user may use the STOP button to stop the scanning at any time and then select a CD.

In the search mode, the scanner module 90 can function in two ways. It can search for the music type or the artist's name. In the music type search, the user can search for CD's of a particular type of music, for example, the Rock category. By pressing the SEARCH button and then entering the type of music code, which here would be "R", the microprocessor 98 will scan memory 100 and the display 96 will move sequentially through all of the CD's that are entered under that category. It will display the location number, the artist's name and the CD title, each for about three seconds. The user may stop the search at any selection and select the CD at that point. In the artist's name tpe search, the procedure is similar. By pressing the SEARCH button and then entering the artist's name, the display will sequentially show all the CD's that are stored in the storage unit 12 by that artist. The title of the CD, its location number and type of music code will be displayed. Each will be displayed for about three seconds. The user may stop the search at any selection and select the CD at that point to retrieve the particular CD. To retrieve the CD, the user uses the knob 80 to slide the carriage 60 and move the location reader device 74 along the row of markings 72. As the markings 72 are sensed, they are sequentially read and displayed on the display 96, enabling the user to locate each of the CD's stored in the storage unit 12 and thus the particular one desired to be retrieved.

As illustrated herein, the system 10 is provided in two separate physical units, the storage unit 12 and the scanner module 90 of the control unit 12. The flat bottom wall 32 has traction pads 118 applied on the corners thereof, as seen in FIG. 3, to facilitate use while resting on a vehicle seat or center console. The separate scanner module 90 and storage unit 12 could be provided as a single unit. The separate units also could be incorporated into other equipment, such as desks and filing cabinets, for application in an office environment.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. An electronic librarian and filing system, comprising:

(a) an article storage unit for storing thin disc-shaped articles in successive side-by-side spaced unique locations;

(b) an article locator mechanism disposed in said article storage unit and movable relative to the successively stored articles to indicate said unique locations in said article storage unit;

(c) an article retrieval mechanism disposed in said article storage unit and movable with said article locator mechanism, said article retrieval mechanism being actuatable to at least partially remove a selected one of the articles from said unique location in said article storage unit so that the article can subsequently be fully removed from said article storage unit; and (d) an electronic control unit operable independently of movement of said article locator mechanism to store and retrieve information identifying all articles stored in said article storage unit and said unique locations thereof such that the unique location of a selected one of the articles can be found by said operation of said electronic control unit independently of movement of said article locator mechanism.

2. The system of claim 1 wherein said electronic control unit includes a digital display for providing an output of said unique locations of the articles in said article storage unit.

3. The system of claim 2 wherein said electronic control unit also includes means for processing and means for storing inputted information identifying the articles stored in the article storage unit and means for providing an input to access such information about the articles stored therein.

4. The system of claim 3 wherein said processing means is a microprocessor, said digital display is connected to said microprocessor.

5. The system of claim 4 wherein said storing means is a memory connected to said microprocessor.

6. The system of claim 5 wherein said microprocessor is programmed to function in scan and search modes so as to access said memory and find the number identifying said unique location of a selected article in said article storage unit.

7. The system of claim 4 wherein said input providing means is a keyboard connected to said microprocessor.

8. An electronic librarian and filing system, comprising:
(a) an article storage unit for storing thin disc-shaped articles in successive side-by-side spaced unique locations, said article storage unit including
  (i) an elongated receptacle having front, rear, bottom and opposite end walls interconnected together and defining an interior cavity having an upper opening, said opposite end walls of said receptacle including arcuate-shaped guide channels formed on interior sides of said opposite end walls and having portions extending along said upper opening, and
  (ii) a cover assembly having arcuate-shaped front and rear lid sections slidably mounted at respective opposite ends in said arcuate-shaped guide channels on said opposite end walls of the receptacle, said front and rear lid sections being movable relative to each other and to the receptacle between closed and opened positions relative to said upper opening;
(b) an article locator mechanism disposed in said article storage unit and movable relative to the successively stored articles to indicate said unique locations in said article storage unit; and
(c) an article retrieval mechanism disposed in said article storage unit and movable with said article locator mechanism, said article retrieval mechanism being actuatable to at least partially remove a selected one of the articles from said unique location in said article storage unit when said front and rear lids are disposed in said opened position relative to said upper opening so that the article can subsequently be fully removed from said article storage unit.

9. The system of claim 8 wherein said front and rear lid sections, in said closed position, are disposed in side-by-side relationship with respect to one another and together extend over said interior cavity and cover said upper opening defined in an upper portion of said receptacle between said opposite end walls thereof.

10. The system of claim 9 wherein said front and rear lid sections, in said opened position, are disposed in overlapped relationship with respect to one another and expose said opening defined in said upper portion of said receptacle.

11. An electronic librarian and filing system, comprising:
(a) an article storage unit for storing thin disc-shaped articles in successive side-by-side spaced unique locations;
(b) an article locator mechanism disposed in said article storage unit and movable relative to the successively stored articles to read said unique locations in said article storage unit, said article locator mechanism including
  (i) a carriage,
  (ii) laterally spaced guide members mounting said carriage to undergo sliding movement along said guide members in said article storage unit between opposite ends of said article storage unit,
  (iii) a location reading arrangement mounted on said carriage and article storage unit; and
(c) an article retrieval mechanism disposed in said article storage unit and movable with said article locator mechanism, said article retrieval mechanism being actuatable to at least partially remove a selected one of the articles from said unique location in said article storage unit so that the article can subsequently be fully removed from said article storage unit.

12. The system of claim 11 wherein said location reading arrangement includes:
a row of markings mounted on said article storage unit in alignment with said plurality of unique locations; and
a location reader device mounted on said carriage and operable for reading said markings one at a time.

13. The system of claim 11 wherein said guide members are front and rear guide members located in the lower portion of a cavity defined in a receptacle of said article storage unit.

14. The system of claim 13 wherein said front guide member is a rod mounted between the opposite ends of said article storage unit.

15. The system of claim 13 wherein said rear guide member is a rail disposed along a rear side of said said article storage unit.

16. The system of claim 15 wherein said carriage is a platform having a rear edge portion slidably received within a groove of the rear guide rail and at least one collar attached to an opposite front edge portion of the platform and slidably received over the front guide rod.

17. The system of claim 15 wherein said location reading arrangement includes a row of markings defined in said article storage unit above the rear guide rail, each marking being aligned with one of said unique locations in said article storage unit.

18. The system of claim 17 wherein said location reading arrangement also includes a location reader device mounted on said carriage adjacent the rear edge portion thereof and facing toward the row of markings, said reader device being operable to sense the different markings and thus provide a reading of the one of the markings with which said reader device happens to be aligned.

19. The system of claim 18 wherein said article storage unit includes an elongated receptacle having front, rear, bottom and opposite end walls interconnected together and defining an interior cavity having an upper opening.

20. The system of claim 19 wherein said article storage unit further includes a support rack disposed in the interior cavity of the receptacle and forming a row of individual storage compartments defining the successive side-by-side spaced unique locations and receiving and supporting the articles at the unique locations in a spaced side-by-side vertical relationship.

21. The system of claim 20 wherein said article retrieval mechanism includes:
an ejector member disposed under said support rack in said receptacle and movable vertically relative to said support rack to lift a selected one of the articles at least partially upwardly from said support rack; and
an actuator lever coupled to said ejector member and being actuatable to move said ejector member.

22. The system of claim 21 wherein said ejector member is pivotally mounted on said front guide member and has an outer handle portion extending exterior of said receptacle and an inner link portion pivotally coupled to said ejector member so as to cause said ejector member to move between lowered and raised positions upon movement of said handle portion between upper and lower positions.

23. The system of claim 22 wherein said ejector member is slidably mounted to undergo vertical movement through an opening defined in said carriage and between a pair of facing guide tracks supported on said carriage at opposite ends of said opening such that pivoting of said actuator lever causes slidable movement and lifting of said ejector member upwardly through an elongated slot formed in the bottom of the support rack.

24. An electronic librarian and filing system, comprising:
(a) an article storage unit for storing thin disc-shaped articles in successive side-by-side spaced unique locations, said article storage unit including
   (i) an elongated receptacle having front, rear, bottom and opposite end walls interconnected together and defining an interior cavity having an upper opening, and
   (ii) a support rack disposed in said interior cavity of said receptacle and forming a row of individual storage compartments defining the successive side-by-side spaced unique locations for receiving and supporting the articles at the unique locations in a spaced side-by-side vertical relationship, said support rack including a bottom wall having a curved configuration and a top wall overlying said bottom wall and having a flat configuration, said storage compartments being defined by a series of spaced arcuate-shaped recesses defined on said bottom wall and facing toward said top wall and a-series of spaced slots defined through said top wall and being aligned with said recesses on said bottom wall for receiving the articles through said respective slots of said top wall and supporting edges of the articles in said recesses on said bottom wall;
(b) an article locator mechanism disposed in said article storage unit and movable relative to the successively stored articles to indicate said unique locations in said article storage unit; and
(c) an article retrieval mechanism disposed in said article storage unit below said support rack and movable with said article locator mechanism, said article retrieval mechanism being actuatable to at least partially remove a selected one of the articles from said unique location in said article storage unit so that the article can subsequently be fully removed from said article storage unit.

25. The system of claim 24 wherein said article storage unit further includes a handle having a generally U-shaped configuration and a pair of opposite end legs, said handle being mounted at said opposite end legs to said opposite end walls of the receptacle to undergo pivotal movement between an upright position and a folded position relative to the receptacle.

26. The system of claim 25 wherein said handle, in said upright position, is deployed above and along the cavity of the receptacle permitting gripping of the handle and carrying of the storage unit.

27. The system of claim 25 wherein said handle, in the folded position, is stowed behind the receptacle out of the way.

* * * * *